Dec. 24, 1963

R. M. PIERCE 3,115,627

FLIGHT INDICATOR

Filed Feb. 25, 1960

INVENTOR.
ROBERT M. PIERCE
BY
ATTORNEY
AGENT

Dec. 24, 1963    R. M. PIERCE    3,115,627
FLIGHT INDICATOR
Filed Feb. 25, 1960    2 Sheets-Sheet 2
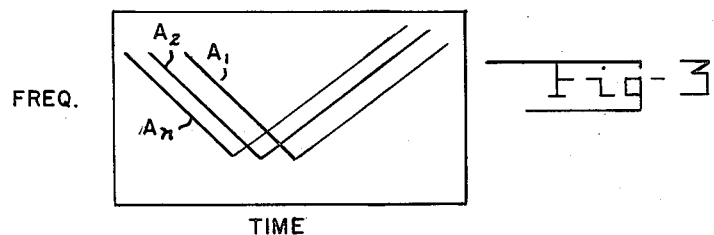
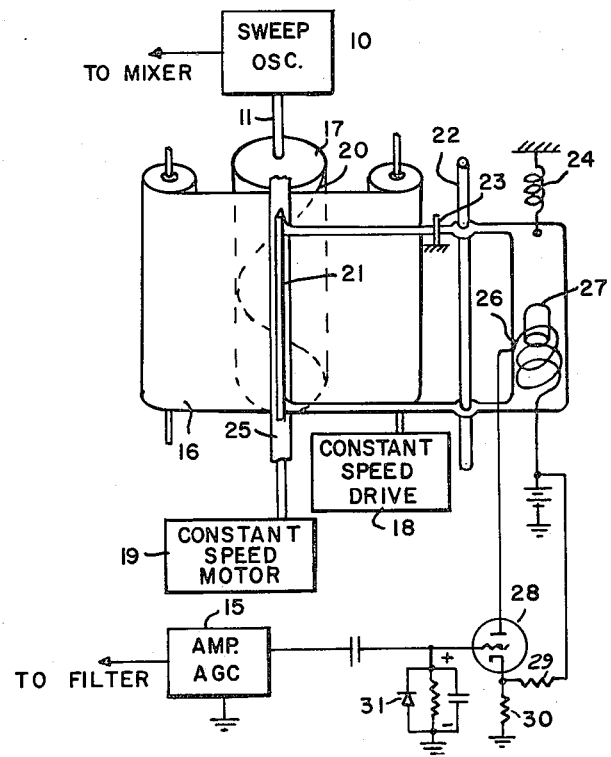
INVENTOR.
ROBERT M. PIERCE
BY Wade Loontz
ATTORNEY
James S. Shannon
AGENT

United States Patent Office 3,115,627
Patented Dec. 24, 1963

3,115,627
FLIGHT INDICATOR
Robert M. Pierce, Utica, N.Y., assignor to the United States of America as represented by the Secretary of the Air Force
Filed Feb. 25, 1960, Ser. No. 11,106
2 Claims. (Cl. 343—8)
(Granted under Title 35, U.S. Code (1952), sec. 266)

The invention described herein may be manufactured and used by or for the United States Government for governmental purposes without payment to me of any royalty thereon.

The purpose of this invention is to give an accurate indication of the number of aircraft making a raid in a given area. Briefly, the apparatus comprises transmitting and receiving antennas of medium beam width. The antennas are for fixed operation with provision for slewing to different azimuth and elevation angles. The angular settings of both the transmitting and receiving antennas are synchronized together, and the distance between the two antennas is as small as possible without causing them to interfere.

The transmitting antenna is fed with constant frequency continuous wave energy. When an aircraft comes within the space surveyed by the antennas some of the radiated energy is reflected by the aircraft to the receiving antenna. The received energy will have suffered a Doppler shift in frequency of an amount and sign depending upon the radial velocity of the aircraft. The received and transmitted frequencies are applied to a superheterodyne receiver, the output of which has a frequency equal to the difference between the received frequency and the transmitted frequency. Since each aircraft in the surveyed space will have a different radial velocity relative to the ground station, the receiver will have a different output frequency for each aircraft. The frequencies of the receiver outputs are then plotted along a time base by means of a suitable recording frequency analyzer to give an indication of the number of aircraft in the surveyed space at any time.

A more detailed description of the invention will be given with reference to the specific embodiment thereof shown in the accompanying drawings, in which:

FIG. 1 is a block diagram of the complete raid size indicating apparatus,

FIG. 2 of the receiver and recording arrangement,

FIG. 3 is a typical graph made by the recorder, and

FIG. 4 is a typical recording frequency meter.

Figure 1:
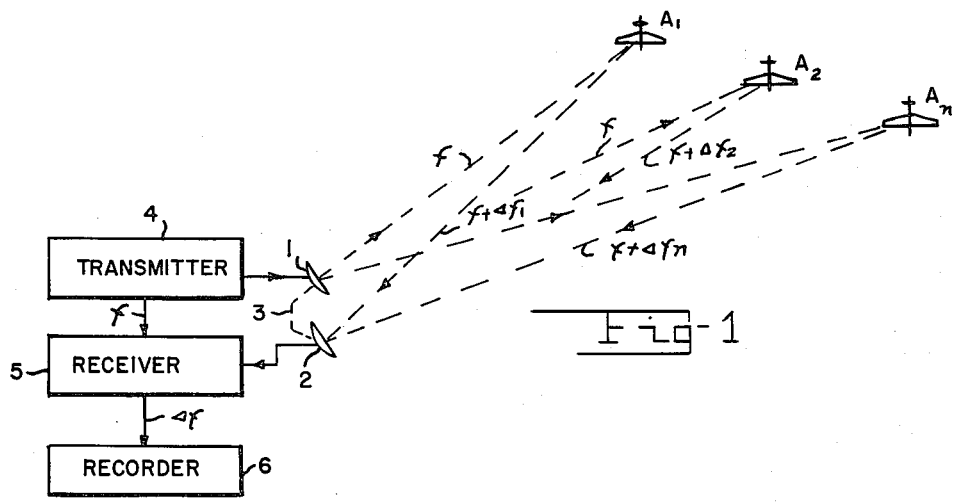

Referring to FIG. 1, similar directional transmitting and receiving antennas 1 and 2 are mechanically coupled in any suitable manner, indicated by coupling 3, to permit their adjustment over a range of azimuth and elevation angles while keeping the beam axis parallel. The antennas should be of medium beam width and mounted as closely together as possible without interfering. The antennas are operated at selected fixed azimuth and elevation angles as required to survey the raiding aircraft group.

Transmitter 4 applies continuous wave energy of constant frequency $f$ to transmitting antenna 1. The radiated energy strikes the aircraft $A_1$, $A_2$, and $A_n$ and a small amount of it is reflected to receiving antenna 2. Since the aircraft are illustrated as approaching the ground station, the reflected energies have increased frequencies of $f+\Delta f_1$, $f+\Delta f_2$ and $f+\Delta f_n$ due to the Doppler effect. The frequency change decreases as an aircraft approaches the ground station, becomes zero when the aircraft is directly opposite the ground station where the radial velocity is zero, and increases again as the aircraft moves away from the ground station, so that a graph of the difference frequencies along a time base may appear as shown in FIG. 3 for the three aircraft illustrated. The signals received at the receiving antenna are mixed in receiver 5 with a signal of frequency $f$, either derived directly from the transmitter or resulting from spillover from the transmitting to the receiving antenna, to produce the difference frequencies $\Delta f$ in the receiver output. These frequencies are applied to the recording frequency analyzer 6 which produces a graph of the type shown in FIG. 3.

Figure 2:
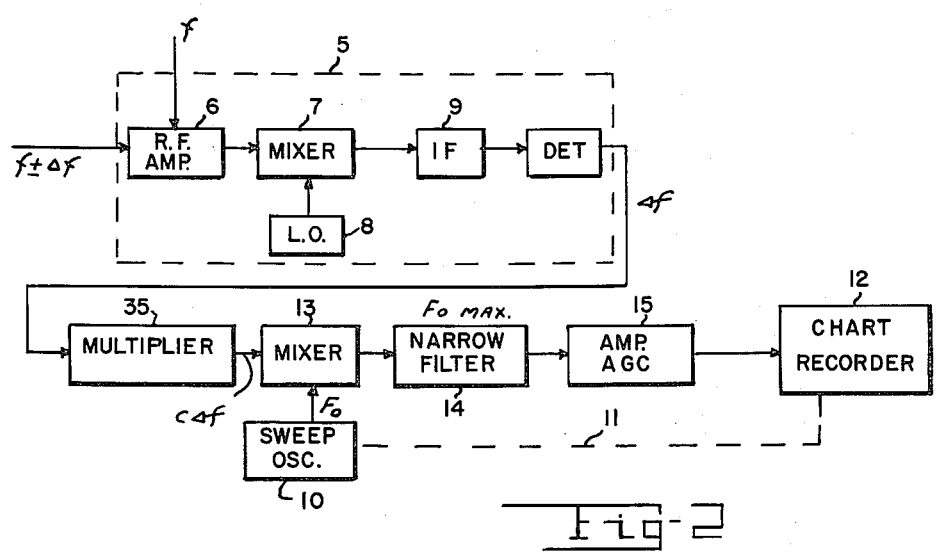

FIG. 2 shows in block form the receiver 5 and the recording circuit. The frequencies $f$ and $f \pm \Delta f$ are amplified by R.F. amplifier 6 and applied to mixer 7 where they beat with the frequency of local oscillator 8 to produce two intermediate frequencies which also have a frequency difference $\Delta f$. The two intermediate frequencies, after amplification in I.F. amplifier 9, are applied to detector 10 to produce the difference frequency $\Delta f$ which appears in the detector output. A multiplier 35 may be used to raise this frequency to $C\Delta f$, where C is a constant, for easier recording.

There are a number of ways to record $\Delta f$ along a time axis. In the embodiment shown, a sweep oscillator 10 is driven by a suitable coupling 11 from the frequency axis sweep mechanism of recorder 12. As the printing mechanism of the recorder sweeps linearly over the frequency axis, the sweep oscillator frequency varies linearly from a minimum frequency $F0_{min}$ to a maximum frequency $F0_{max}$. The sum of the oscillator frequency F0 and the Doppler frequency $C\Delta f$ is obtained in mixer 13 and applied to a filter 14 passing only the frequency $F0_{max}$. The Doppler frequency $C\Delta f$ varies from zero to a maximum value determined by the maximum radial velocity encountered. Therefore, if the difference in the maximum and minimum values of F0 is made equal to the maximum value of $C\Delta f$, at some point in the sweep of F0 the sum of F0 and $C\Delta f$ will equal $F0_{max}$. When this occurs, a pulse of $F0_{max}$ passes filter 14 to amplifier 15. This amplifier may be equipped with an automatic gain control so that the pulses applied to recorder 12 are all of the same amplitude.

A known type of recorder suitable for use with the above described apparatus is shown in FIG. 4. The chart 16 is moved at constant speed past cylinder 17 by means of constant speed drive 18. Cylinder 17, mounted on shaft 11, is driven at a constant speed by motor 19. Sweep oscillator 10 is driven from shaft 11 and, therefore, operates in synchronism with cylinder 17, its frequency changing from $F0_{min}$ to $F0_{max}$ during each 360° rotation of the cylinder. Cylinder 17 has a helical ridge 20 which makes one complete revolution on the cylinder in an axial distance equal to the transverse recording dimension of the chart. A printing blade 21 is pivoted about shaft 22 and is normally held away from the paper and against stop 23 by spring 24. An inked ribbon 25 passes between bar 21 and the chart. When the bar is momentarily actuated toward the cylinder, the ribbon and the chart are compressed between the bar and the helical ridge making a mark on the paper at that point.

Bar 21 is controlled by coil 26 which attracts armature 27 when energized by a pulse of current. For this purpose tube 28, normally biased to cut-off by potential divider 29—30, has its anode circuit connected in series with the coil. An output pulse from amplifier 15 is rectified by diode 31 and momentarily raises the grid of tube 28 above cut-off causing a printing operation. The sweep oscillator is so related to cylinder 17 that the oscillator passes through $F0_{max}$ when the helix is beneath the lowest or zero frequency point on the chart.

I claim:
1. Apparatus for indicating the number of aircraft in a flight comprising closely spaced transmitting and re- ceiving antennas, said antennas having medium beam widths and parallel beam axes, a transmitter coupled to said transmitting antenna and feeding continuous wave energy of fixed frequency thereto, a receiver coupled to said receiving antenna for receiving reflections from said aircraft of the energy radiated by said transmitting antenna, means for applying a signal of said transmitter frequency to the input of said receiver whereby signals having frequencies equal to the difference between the frequencies of said reflections and said transmitter frequency appear simultaneously in the output of said receiver, and means coupled to the output of said receiver for recording the frequencies of the said receiver output signals as functions of time.

2. Apparatus as claimed in claim 1 in which a frequency multiplier is situated between the output of said receiver and the input to said recorder for multiplying said difference frequencies by a constant factor.

References Cited in the file of this patent

UNITED STATES PATENTS

| | | |
|---|---|---|
| 1,981,884 | Taylor | Nov. 27, 1934 |
| 2,491,542 | Woodyard | Dec. 20, 1949 |
| 2,817,081 | Roberts | Dec. 17, 1957 |
| 2,878,467 | Barker | Mar. 17, 1959 |